United States Patent

[11] 3,551,751

[72] Inventor  Friedel Twellsiek
              Milse, near Bielefeld, Germany
[21] Appl. No. 706,392
[22] Filed     Feb. 19, 1968
[45] Patented  Dec. 29, 1970
[73] Assignee  Schleicher Regelautomatik GmbH & Co., KG
              Bielefeld, Germany
              a corporation of Germany
[32] Priority  Feb. 18, 1967, Mar. 10, 1967, Mar. 25, 1967, Apr. 19, 1967, June 21, 1967, July 8, 1967, Oct. 14, 1967, Dec. 13, 1967
[33]          Germany
[31]          Pats. Sch 40,271, 1,638,279, 1,638,280, 1,638,283, 1,638,288, 1,638,289, 1,588,826 and 1,638,295

[54] SWITCHING SYSTEM FOR INDUCTIVE LOADS
     14 Claims, 8 Drawing Figs.
[52] U.S. Cl. .................................................. 317/123;
              307/11, 307/93; 317/11, 317/148.5, 317/155.5;
              321/11
[51] Int. Cl. .................................................. H02h 1/00
[50] Field of Search ........................................ 317/123(RM),
              155.5, 137, 148.5; 307/104, 98, 93;
              313/79; 323/81, 7, 8

[56]              References Cited
                UNITED STATES PATENTS
3,293,505  12/1966  Miller ........................ 317/123CM Primary Examiner—J D Miller
Assistant Examiner—W. J. Smith
Attorney—Karl F. Ross ABSTRACT: One or more inductive loads are individually energized from a source of pulsating or continuous direct current and are shunted by respective condensers, or by a common condenser, which upon disconnection of any load from the source receive the inertia current of the load by way of a low-ohmic charging circuit including a diode; the condenser is subsequently discharged over a high-ohmic circuit which may lead, e.g. through another diode, over a resistor or over a different inductive load to be energized upon deenergization of the first load. With pulsating current, energization may be initiated by the triggering of a controlled rectifier which cuts off after the first half cycle while the condenser keeps the load current flowing, the cutoff being inductively translated into a command voltage which triggers the same or another controlled rectifier to repeat the cycle, possibly with a different operating voltage; the switchover from one voltage to another may also occur under the control of an RC network in the input circuit of the first controlled rectifier.

Friedel Twellsiek
INVENTOR.

BY

Karl J. Ross
Attorney

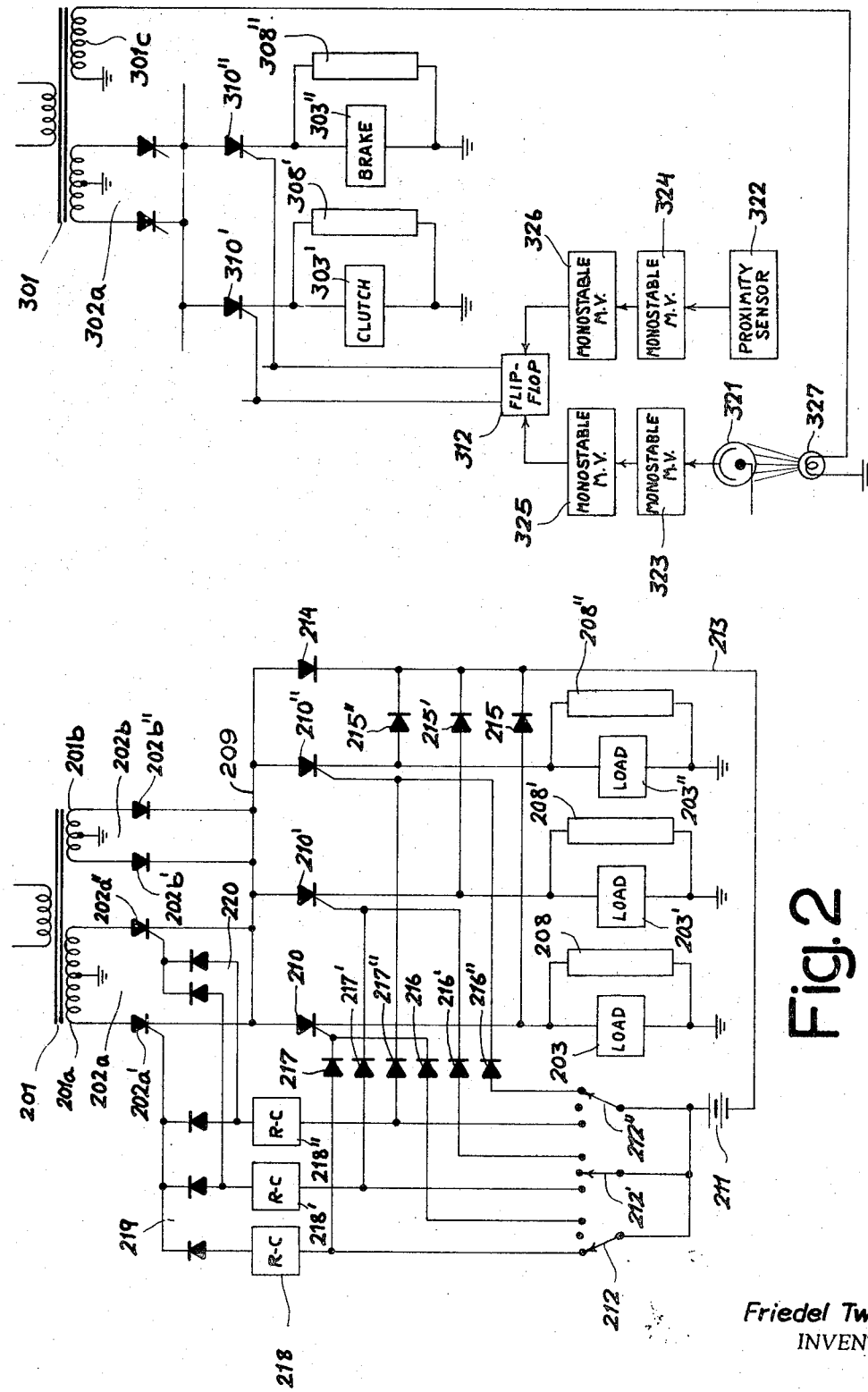

Friedel Twellsiek
INVENTOR.

BY

Karl F. Ross
Attorney

SWITCHING SYSTEM FOR INDUCTIVE LOADS

My present invention relates to a circuit arrangement for the controlled energization and deenergization of one or more loads of predominantly inductive character, e.g. electromagnetic clutches or brakes.

It is well known the that such loads store electromagnetic energy which, upon their disconnection from a source of unidirectional operating voltage, tend to maintain the operating current flowing, thereby generating an opening spark across the separating contacts of a mechanical switch or delaying the cutoff of a thyratron-type device, such as a controlled rectifier or thyristor, provided for the electronic switching of the load.

It is, therefore, the general object of my present invention to provide, in a switching circuit of the character described, means for rapidly quenching the inertia current traversing the load upon its disconnection from a source of unipolar operating voltage.

Another object of this invention is to provide means in such system for facilitating the switchover from a first to a second predominantly inductive load, advantageously with utilization of the residual electromagnetic energy from the first load as part of the useful operating current of the second load.

A related object is to provide means for selectively switching, in the aforedescribed manner, between a principle load and one of several ancillary loads, as where a brake acts upon a shaft which may be selectively driven at different speeds and/or in different directions by way of different clutches upon the release of the brake.

It is also an object of my invention to provide a circuit arrangement of this character in which a controlled rectifier or other thyratron-type switching device is triggerable at the beginning of an energizing cycle to drive the load with pulsating or raw-rectified unidirectional current and which, upon such triggering, keeps the load operated independently of that switching device by means of a lower voltage current supply, thereby enabling the load to be energized with a relatively large initial current delivering the starting torque whereupon the current flow is reduced to a relatively low maintenance level, the subsequent cutoff occurring at this low level with a consequent decrease of the stored electromagnetic energy to be dissipated.

These objects and other s which will subsequently appear, can be realized in accordance with my present invention by the provision of a capacitor (or combination of capacitors) connected across the predominantly inductive load in series with one or more diodes so poled as to oppose direct charging of the capacitor or capacitors from a source of unipolar current connected thereacross, the capacitor means being provided with a high-ohmic discharge path for the dissipation of a charge built up thereon by the flow of an inertia current in the forward or low-ohmic direction of the associated diode means upon the disconnection of the load from its current source.

In a simple case, this high-ohmic discharge path may be constituted by a resistor bridging the charging diode, the magnitude of this resistor being advantageously on the order of 50 to 100 times the load impedance; if, however, the charging diode is only an imperfect insulator in the reverse direction, this discharge path may lead through the diode itself. Alternatively, or in combination therewith, the inertia current from the first load may be directed through a second predominantly inductive load, e.g. by way of another diode whose polarity as seen from the quenching capacitor is opposite that of the first mentioned diode. In this manner, if the two loads are to be energized in immediate succession but not concurrently, the eletromagnetic energy stored in the first load need not be converted completely into heat but may be utilized for the performance of useful work on the second load.

In order to minimize the buildup of a charge on the quenching capacitor during prolonged energization, I prefer—pursuant to another feature of may invention—to connect the high-ohmic discharge path in series with a capacitor-shunting low-ohmic path so as to form a voltage divider across the power supply, at least in the closed condition of the controlling switch means, this low-ohmic path advantageously comprising a half wave rectifier (preferably a zener diode) connected in bucking relationship with the charging diode. A similar effect is obtained if the same capacitor serves two or more predominantly inductive loads which are to be alternately energized; in that event, the second load may serve as a charge-limiting impedance connected, in series with its own charging diode, across the quenching capacitor.

The arrangement just described results in the continuous flow a trickle current, limited by the high-ohmic discharge impedance, through the momentarily unoperated load or loads. If the presence of such a trickle current is not objectionable, I may also provide a modified circuit arrangement in which this current passes, in the open state of the controlling switch through the resistive branch of a protective resistance/capacitance network which is connected across that switch in series with the charging diode. The impedance of the capacitive branch of the network should be considerably higher than that of the quenching capacitor or condenser bridging the load, e.g. on the order of 5 to 10 times as high. This arrangement further opposes the buildup of a sparking or extinction-delaying reverse voltage across the switch.

In accordance with still another feature of my invention, two concurrently or successively energizable loads of the type described are connected across a common quenching capacitor in series with respective charging diodes so connectable across their common power supply as to carry currents of opposite polarities (again as seen from the common condenser when their respective circuits are closed. With this arrangement, the inertia current charging the condenser upon the cutoff of the first load from the source will have a polarity capable of energizing the second load in the forward direction of its charging diode so that, if this second load is operative at that instant, the current will contribute to its energization. If the energizing circuit of the second load is open, the magnitude of this discharge current will be limited by the inductive reactance of that load.

If the energization of the load is controlled by a thyratron-type switching device I may connect this device to a bus bar adapted to receive either a relatively high starting voltage by way of another thyratron-type device or a relatively low, steady state voltage via a rectifying connection which in that case may be simply a diode. If the voltage source is of the pulsating type, the cessation of current flow through the thyratron or thyristor or may inductively generate a new trigger pulse to be fed back to the input of the same or another switching device so as periodically to reignite that device until the feedback path is broken; the inductively generated pulses, if fed back to a switching device other than the one initially triggered, may also be sued to supply a reduced load current during steady state operation. The switchover from one current source to another other may be controlled by a timing network of the resistance/capacitance type which, after a predetermined and preferably adjustable interval, blocks the first switching device even in the closed state of a manually or otherwise operable starting switch whereupon the second switching device, triggered by the recurrent feedback pulse, takes over the energization of the load.

The invention will be described in greater detail with references to the accompanying drawing in which:

FIG. 2 is a more elaborate circuit diagram representing a system with several loads;

FIG. 3 is a diagram showing specific means for starting and stopping the energization of several loads in a system similar to that of FIG. 2;

Figure 1:
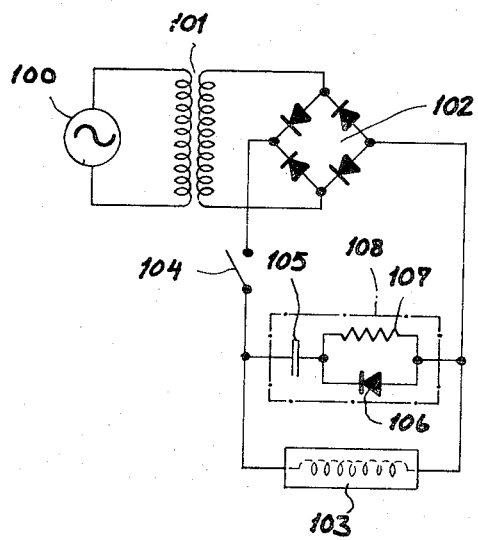
FIG. 1 is a circuit diagram illustrating the basic aspects of the invention.
Figure 6:
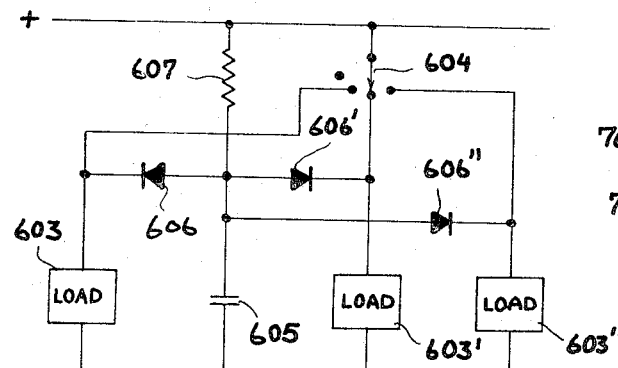
Figure 7:
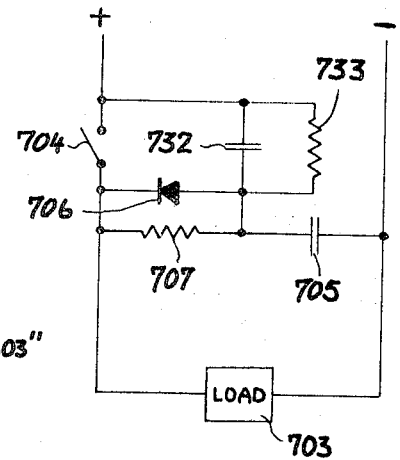
Figure 8:
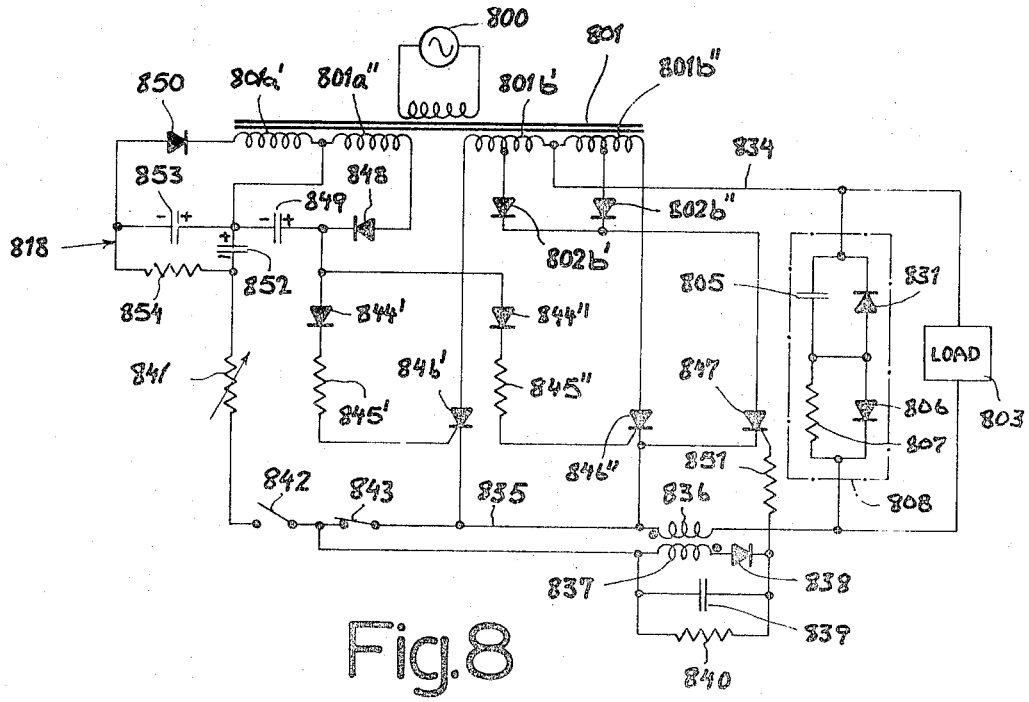

FIGS. 4—7 are further basic circuit diagrams, generally similar to FIG. 1, showing additional modifications; and FIG. 8 is elaborate more elaborate diagram of a circuit arrangement embodying some of the elements of the preceding FIGS. together with still other features of the invention.

The system shown in FIG. 1 comprises a source 100 of alternating current connected by way of an input transformer 101 across a rectifier bridge 102 to energize a predominantly inductive load 103 by way of a control switch 104 in series therewith. Although the switch has been illustrated diagrammatically as a manually operable pair of contacts, it is to be understood that this circuit element is also representative of a variety of conventional vacuum-type or solid state devices, such as transistors; in particular, the switch element 104 (and similar elements elements illustrated in subsequent FIGS.) may be controlled rectifier or thyristor which can be triggered and extinguished in a manner more fully described hereinafter.

In accordance with this invention, the load 103 is shunted by a quenching circuit including a capacitor 105 in series with a diode 106, the latter being bridged by a high-ohmic resistor 107. As noted above, resistor 107 may also be replaced in whole or in part by the reverse resistance of diode 106; in any event, the resistance of the combination 106, 107 (or 106 alone) in the direction of current flow from source 100-102 should be high compared with the impedance of load 103 during steady state operation.

The quenching network 105-107 advantageously is designed as an integrated module 108 adapted to be connected across the load 103 or to be replaced by a similar module with different circuit parameters.

In operation, closure of switch 104 energizes the inductive load 103 with continuous or pulsating direct current, depending on whether the output of bridge 102 is filtered or not. Owing to the high resistance 106, 107 lying in series with condenser 105, only a small charging voltage develops across the condenser, particularly if the supplied current pulsates so that any incipient potential buildup is promptly neutralized by a discharge through the forward resistance of diode 106 as soon as the condenser voltage is reversed at the end of each half cycle.

Upon the opening of switch 104, the electromagnetic energy stored in load 103 gives rise to an inertia current which has the same polarity as the operating current previously passed therethrough, and therefore, charges the condenser 105 by traversing the diode 106 in its forward direction. The reversal of this current flow is impeded by the diode 106 so that only a small discharge current of predominantly ohmic character passes through the load in the opposite direction, the residual energy being dissipated in elements 106 and 107. The heavy damping of this discharge current prevents the generation of oscillations across condenser 105. Moreover, this discharge current rapidly cancels the electromagnetic field still existing in load 103. With proper dimensioning of condenser 105, the latter resonates the load inductance at a frequency which is substantially higher than that of source 100 (e.g. the usual utility frequency of 50 or 60 c.p.s.) so that the load is effectively deenergized almost instantly after the opening of switch 104, i.e. within half a cycle of this resonance frequency.

In FIG. 2 I have shown a circuit arrangement for the alternate or concurrent energization of plurality of inductive loads 203, 203'203" from a common source of raw-rectified current represented by a transformer 201 with two secondary windings 201a, 201b. These secondaries work into a common bus bar 209 by way of a first rectification network 202a, including a pair of controlled rectifiers of thyristors 202a', 202a", and a second rectification network 202b, comprising a pair of diodes 202b, and 202b". It will be assumed that winding 201a has more turns and therefore delivers a higher output voltage than winding 201b.

The loads 203, 203', 203", each shunted by an individual quenching network 208, 208', 208" of the type described in connection with FIG. 1, are connected in parallel between bus bar 209 and ground in series with further controlled rectifiers 210, 210', 210", respectively. A source of triggering voltage 211, diagrammatically illustrated as a battery, is connected between a set of selector switches 212, 212', 212" and a neutral conductor 213 which in turn is tied to bus bar 209 and to the cathodes of thyristors 210, 210', 210" through respective diodes 214, 215, 215' and 215". Selector switches 212, 212', 212" have various bank contacts connected to the gates of thyristors 210, 210', 210" through respective diodes 216, 216', 216" and, in parallel therewith, through other diodes 217, 217', 217", the anode leads of the latter diodes being also joined to respective timing networks 218, 218', 218" of the resistance/capacitance type, e.g. as described hereinafter with reference to FIG. 8, whose outputs control the gate electrodes of thyristors 202a', 202a" through a set of diodes 219 and 220, respectively; with the particular arrangement illustrated, thyristor 202a' is triggerable by means of any switches 212, 212', 212" whereas thyristor 202a' responds only to the last-mentioned switches.

With switch 212 positioned to energize network 218, thyristors 202a' and 210 conduct so that load 203 receives the relatively large starting current from secondary 201a. If, after a predetermined interval, network 218 cuts off the input voltage to the thyristor 202a', the latter is deactivated at the end of the current half cycle while bus bar 209 remains energized via diodes 202b', 202b" from the low voltage transformer secondary 201b; since the 202b" of thyristor 210 remains connected to voltage source 211, this thyristor continues operating to energize the load 203, albeit with a lower current. With switch 212 on its alternate working contact, thyristor 202a' is not fired and load 203 is energized exclusively from low voltage current supply 202b. If switch 212' is similar actuated, load 203' undergoes a like energization, except that thyristors 202a' and 202a" fire alternately so that the average starting current is still higher. The same is true of load 203" as controlled by switch 212".

If, as illustrated, the selector switches are set to start the energization of one load (e.g. 203) with high current while another load (e.g. 203") is driven with low current, the latter load must be able to tolerate a temporary increase in the potential of bus bar 209 during its steady state operation; otherwise such concurrent or overlapping energization must not be permitted.

In FIG. 3 I have shown a system similar to that of FIG. 2, though reduced to only two loads 303' (a clutch) and 303" (a brake) each with its associated quenching network 308', 308", in which the corresponding thyristors 310' and 310" are electronically controlled to cause instant switchover between the two loads. This switchover is effected by a flip-flop 312 having its "set" and "reset" output terminals respectively connected to the gates of thyristors 310' and 310", the gate-cathode circuits of these thyristors being completed in a manner similar to that of FIG. 2 (via diodes 214, 215', 215") and not further illustrated. The thyristors of the high voltage supply network 302a are also energizable from these flip-flop outputs in a manner analogous to that illustrated for the switches 212' and 212" in FIG. 2. The low voltage supply network (202b in FIG. 2) has likewise been omitted in FIG. 3.

The alternate setting and resetting of flip-flop 312 proceeds under the control of two triggering devices 321, 322 working into respective monostable multivibrators 323, 324 controlling similar multivibrators 325, 326 cascaded therewith. Device 321 is shown as a photocell responding to light from a lamp 327 which is energized by another secondary 301c of input transformer 301. Device 322 may be a proximity sensor. The recovery intervals of multivibrators 323 and 324 are considerably longer than those of multivibrators 325 and 326 in order to permit but a single tripping of the latter multivibrators during a predetermined operating period of the machinery controlled by clutch 303' and brakes 303".

Let is be assumed that the clutch 303' and the brake 303" control the operation of a machine tool, such as a lathe, having a tool carriage supporting either the photocell 321 or the lamp 327, the other element of this photoelectric detector being fixedly positioned on the machine bed. After power has been connected to transformer 301, lamp 327 lights and, in a predetermined starting position in which the carriage may be manually placed, trips first the multivibrator 323 and then the multivibrator 325 which works into the setting input of flip-flop 312 to fire thyristor 310'. Clutch 303' is now energized and transmits the driving torque of a motor to a lead screw or other transmission means, not shown, so as to advance the carriage. The proximity sensor 322, adjustably positioned at a selected location along the carriage path, goes into action at the end of the variable working stroke and successively trips multivibrators 324 and 326 to reset the flip-flop 312, thereby extinguishing the thyristor 310' and firing the thyristor 310". Brake 303" is now actuated to arrest the carriage, with concurrent release of clutch 303'. The cycle can then be repeated, e.g. after manual deenergization of transformer 301.

Naturally, the devices 321 and 322 are representative of a wide variety of electrical, mechanical, optical or other position indicators of conventional type.

Figure 4:
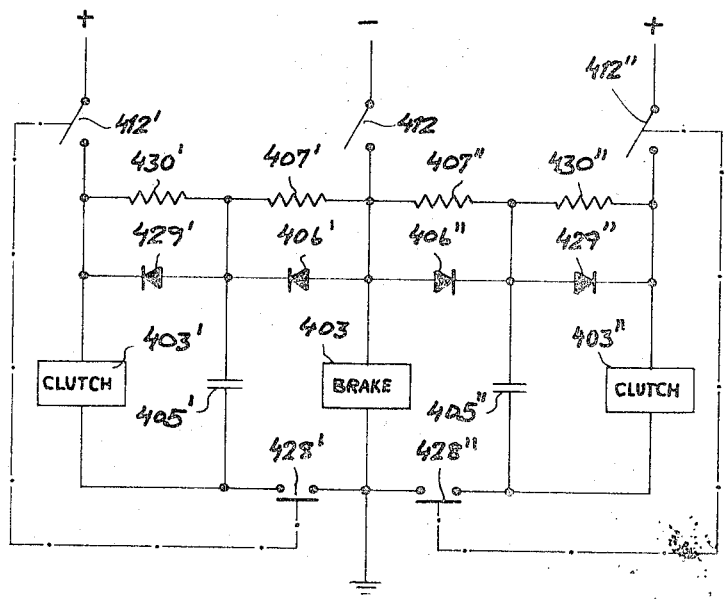

FIG. 4 shows a system with three loads 403, 403', 403" which, by way of example, may be a brake and a pair of alternately operable clutches associated therewith. Switches 412, 412', 412", indicated diagrammatically, serve to connect the central load 403', 403" to a positive terminal of an associated DC power source whose neutral point (ground) is connected directly to load 403 and is also connectable, through respective circuit breakers 428', 428", to loads 403, 403" switches 412' and 412" are coupled, mechanically or otherwise, with circuit breakers 428' and 428", respectively, for simultaneous closure.

A pair of quenching condensers 405', 405" are individually connectable, by way of the circuit breakers 428', 428", across the load 403 in series with respective diodes 406', 406" poled in the reverse direction with reference to the flow of operating current between ground and the negative source terminal. Two further diodes 429' and 429" are connected in series with condensers 405' and 405", respectively, and the corresponding outer loads 403', 403", again with a polarity to oppose any charging of these condensers by the load current upon closure of switch 412' or 412". The diodes 406', 406" and 429', 429" are bridged by respective resistors 407', 407" and 430', 430" which again could be merged with the diodes themselves.

With switch 412 initially closed, brake 403 is operated by advantageously, a pulsating current which, as long as circuit breakers 428', 428" are open, cannot build up any charge on condensers 405' and 405". If, concurrently with or prior to the opening of switch 412, contacts 412' and 428' are closed, the electromagnetic force stored in load 403 will charge the condenser 405' upon the opening of switch 412, the condenser then discharging aperiodically through resistor 407' and load 403 and generally sinusoidally through diode 429' and load 403'; the latter current will be converted into useful energy for operating the clutch 403'. Similarly, disconnection of load 403 from its power supply with switches 412", 428" closed will cause the condenser 405" to charge through diode 406" and thereafter to discharge partly through diode 429" and load 403", a portion of the condenser charge being dissipated in resistor 407". When, thereafter, the clutch 403' or 403" is released by the operation of switch 412' or 412", the inertia current is again of such polarity as to traverse the diode 429' or 429" in its low-resistance direction to charge the condenser 405' or 405", the charge being then partly delivered to load 403 by way of closed circuit breaker 428' or 428" in series with diode 406' or 406". Thus, the system shown in FIG. 4 is particularly advantageous where, e.g. by electronic switchover of the type described in connection with FIG. 3, energization of load 403 coincides with the deenergization of load 403' or 403" and vice versa. If desired, the condensers 405', 405" and the associated resistances may be of different magnitudes so as to afford different effective switchover intervals.

Figure 5:
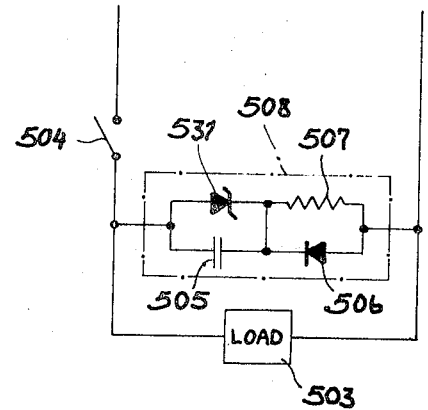

In FIG. 5 I have shown a quenching module 508 which differs from the module 108 of FIG. 1 by the presence of a further rectifying element 531, specifically a zener diode, bridged across condenser 505; this zener diode constitutes, together with resistor 507, a voltage divider connected across the DC power supply upon closure of switch 504, the low-ohmic section 531 of this voltage divider being on shunt with the quenching capacitor 505 so as to limit the buildup of a charge thereon even if the supply voltage is continuous rather than pulsating. It will be noted that the two diodes 506 and 531 are connected in bucking relationship with each other.

Upon the opening of switch 504, the residual current from load 503 charges the condenser 505 with a polarity preventing a rapid discharge through either of the two diodes 506 and 531; as before, the discharge current passes through resistor 507.

In the circuit arrangement of FIG. 6 there is provided a single capacitor 605 common to several loads 603, 603', 603", all connected in parallel, via respective bank contacts of a switch 604, across the positive and negative bus bars of the power supply. Switch 604 is designed for the alternate energization of any of these loads whose quenching networks include, besides the common capacitor 605, respective diodes 606, 606', 606" in series therewith. A high-ohmic discharge circuit for condenser 605 is provided by a resistor 607.

The presence of resistor 607 causes a trickle current to flow continuously through all the loads, by way of their respective diodes, even if the selector switch 604 is open. Each load thus constitutes, together with resistor 607, a voltage divider whose low-ohmic section (i.e. the load) is connected across the condenser 605, thereby limiting the buildup of a charge thereon. When a previously energized load (e.g. 603') is disconnected, its inertial current charges the condenser 605 through the associated diode 606' while being prevented by the other diodes from traversing the remaining loads. Naturally, switch 604 is again representative of a variety of mechanical or electronic load selectors, e.g. of the general type described in connection with FIG. 3.

The system of FIG. 7 includes a protective network, consisting of a capacitance 732 and a resistance 733, connected across switch 704 in series with diode 706 which in turn is bridged, as before, by a resistor 707; the quenching condenser is shown at 705. With switch 704 open, a trickle current passes continuously through load 703 by way of resistor 733 and diode 606, the voltage drop across resistor 733 charging the condenser 732 whose capacitance (e.g. $2\mu F$) is assumed to be a fraction of that of condenser 705 (e.g. $10\mu F$). When the switch 704 is closed, condenser 732 is slowly discharged through resistor 707 and, in doing so, sets up a reverse voltage drop across diode 706. With condenser 732 fully discharged, i.e. during steady state operation, the system of FIG. 7 is equivalent to that of FIG. 1.

When switch 704 is subsequently opened, condenser 732 is recharged by the brief flow of load current therethrough, this current being then taken over by the larger capacitor 705 which like the condenser 732 lies in series with diode 706. Condenser 705, after discharging through resistor 707 and load 703 in the manner described above, retains a small residual charge depending on the relative magnitudes of resistor 733 and the combined ohmic resistance of diode 706 (in the forward direction) and load 703. In practice, the voltage developed across the condenser 705 at this stage may be about 1 percent of the supply voltage, representing a similar ratio between the trickle current in the quiescent state and the full load current upon closure of switch 704 if the forward resistance of diode 706 is considered negligible.

In FIG. 8 I have shown an AC source 800 feeding an output transformer 801 with a first pair of secondary windings 801a', 801a" and a second pair of secondary windings 801b', 801b" for the energization of a predominantly inductive load 803, the latter being again shunted by a quenching network 808 which is similar to the networks described above but includes, besides a capacitor 805, a charging diode 806 and a discharge resistor 807, another diode 831 which is shunted across the capacitor and has a charge-limiting function similar to that of zener diode 531 in FIG. 5. Load 803 and network 808 are connected between a negative lead 834, tied to the junction of windings 801b', 801b", and a positive lead 835, the latter including the primary winding 836 of an inductive coupler or auxiliary transformer having a secondary winding 837 in series with a diode 838 and in shunt with the parallel combination of a condenser 839 and a resistor 840. Lead 835 is coupled to the junction of windings 801a', 801a'' by way of a capacitor 852, a variable resistor 841, a starting switch 842 and a disconnect switch 843 in series, the junction of switches 842 and 843 being connected to a common terminal of winding 837, condenser 839 and resistor 840.

Lead 835 is energizable in parallel by way of three thyristors 846', 846'' and 847; the anodes of thyristors 846', 846'' are tied to high voltage points of windings 801b', 801b'', respectively, whereas that of thyristor 847 is connected via respective diodes 802b', 802b'' to low voltage points of the same windings. The gates of thyristors 846' and 846'' are connected in parallel, by way of respective diodes 844', 844'' and resistors 845', 845'', to one extremity of winding 801a'' through a further diode 848 and through the opposite extremity of that winding, i.e. its junction with winding 801a', through a condenser 849; the other extremity of winding 801a' is returned to that junction through a diode 850 in series with a condenser 853 which, together with capacitor 852 and a resistor 854, forms a time-constant network 818.

With switch 843 closed, the operation of the system of FIG. 8 is initiated by the closure of switch 842. At this stage, the condensers 849, 852 and 853 are charged, with the polarities indicated in the drawing, by current from secondaries 801a', 801a'' as rectified in diodes 850 and 848, respectively. Thus, a gate current of the proper polarity passes through thyristors 846', 846'' so that the latter conduct during positive half cycles of the output voltages of windings 801b' and 801b'' respectively, energizing the load 803. The rise of the load current induces in winding 837 a voltage which is blocked by the diode 838; upon the decay of the load current, this voltage is reversed and is fed back to the load circuit as a command voltage giving rise to a current pulse which passes through the gate-cathode circuit of thyratron 847 by way of a limiting resistor 851 and closed switch 843. The resistance/capacitance network 839, 840 is designed to broaden this current pulse which recurs periodically at the end of each half cycle of source 800.

The triggering of thyristor 847 by the aforesaid command voltage will be ineffectual as long as thyristors 846', 846'' are operative to supply a higher positive voltage to lead 835 than is available at the anode of thyristor 847. This situation changes if switch 842 is opened or after, with this switch closed, the gate current through thyristors 846' and 846'' has reversed the charge of capacitor 852 sufficiently to reduce the magnitude of this gate current below the level necessary to render these thyristors conductive.

The length of this starting interval depends on the relative magnitudes of resistors 841 and 854 so as to be variable by adjustment of one of these resistors, here resistor 841. Upon the ensuing cutoff of thyristors 846' and 846'', the load 803 continues energized at lower voltage through the iteratively triggered thyristor 847 until switch 843 is opened.

The quenching condenser provided in a system according to the present invention also serves to smooth the load current and to minimize the effect of transients in the power supply. Naturally, the arrangements described and illustrated admit of many modifications, including the combination or substitution of compatible features from different embodiments, readily apparent to persons skilled in the art and intended to be embraced within the spirit and scope of my invention as defined in the appended claims.

I claim:
1. A circuit arrangement for the controlled energization of a predominantly inductive load, comprising:
   a source of unipolar current;
   switch means for connecting said source in an operating circuit across said load;
   capacitor means connected across said load;
   impedance means including diode means connected in series with said capacitor means with a polarity opposing direct charging of said capacitor means from said source while permitting such charging by inertial current from said load upon disconnection of the latter from said source by said switch means, said impedance means forming a high-ohmic discharge circuit for said capacitor means; and
   circuit means forming with said impedance means a voltage divider connected across said source in series with said switch means for defining a relatively low-ohmic section and a relatively high-ohmic section for current from said source, said low-ohmic section shunting said capacitor means for limiting the buildup of a charge thereon in the closed state of said switch means.

2. A circuit arrangement as defined in claim 1 wherein said low-ohmic section includes a rectifying element connected in bucking relationship with said diode means.

3. A circuit arrangement as defined in claim 1 wherein said rectifying element is a Zener diode.

4. A circuit arrangement as defined in claim 1 wherein said low-ohmic section includes an inductance forming part of a second load, said switch means being operable to energize said second load from said source in a deenergized state of the first load.

5. A circuit arrangement for the controlled energization of a predominantly inductive load, comprising:
   a source of pulsating direct current;
   thyratron-type switch means for connecting said source in an operating circuit across said load, said switch means being provided with a start circuit operable to render same intermittently conductive during alternate half cycles of said direct current, said start circuit having a feedback path inductively coupled with said operating circuit for generating a new trigger pulse upon the cessation of current flow from said source to said load;
   disconnect means for inhibiting the generation of said trigger pulse;
   capacitor means connected across said load; and
   impedance means including diode means connected in series with said capacitor means with a polarity opposing direct charging of said capacitor means from said source while permitting such charging by inertial current from said load upon disconnection of the latter from said source by said switch means, said impedance means forming a high-ohmic discharge circuit for said capacitor means.

6. A circuit arrangement as defined in claim 5 wherein said circuit means comprises two controlled rectifiers inserted between said load and respective terminals of said source carrying different operating voltages, one of said controlled rectifiers being connectable by said start circuit to a supply of gate current therefor, the other of said controlled rectifiers being connected to respond to trigger pulses from said feedback path.

7. A circuit arrangement for the controlled energization of a predominantly inductive load, comprising:
   a source of unipolar current;
   switch means for connecting said source in an operating circuit across said load;
   capacitor means connected across said load;
   switch means for connecting said source in an operating circuit across said load;
   capacitor means connected across said load;
   impedance means including diode means connected in series with said capacitor means with a polarity opposing direct charging of said capacitor means from said source while permitting such charging by inertial current from said load upon disconnection of the latter from said source by said switch means, said impedance means forming a high-ohmic discharge circuit for said capacitor means; and thyratron-type first circuit means and rectifying second circuit means respectively connected to a relatively high voltage first output and a relatively low voltage second output of said source, said switch means being operable to establish parallel connections from said load to said source by way of said first and second circuit means and thereafter to open only the connection to said first output.

8. A circuit arrangement as defined in claim 7 wherein said switch means includes a timing network in series with said first circuit means for establishing a predetermined interval of closure of the connection to said first output.

9. A circuit arrangement for the controlled energization of a predominantly inductive load, comprising:
  a source of unipolar current;
  switch means for connecting said source in an operating circuit across said load;
  capacitor means connected across said load;
  impedance means including diode means connected in series with said capacitor means with a polarity opposing direct charging of said capacitor means from said source while permitting such charging by inertial current from said load upon disconnection of the latter from said source by said switch means, said impedance means forming a high-ohmic discharge circuit for said capacitor means; and
  circuit means forming with said impedance means a voltage divider connected across said source for defining a relatively low-ohmic section and a relatively high-ohmic section for current from said source, said low-ohmic section shunting said capacitor means.

10. A circuit arrangement as defined in claim 9 wherein said low-ohmic section includes half wave rectifier means connected in said discharge circuit in bucking relationship with said diode means.

11. A circuit arrangement as defined in claim 10 wherein said low-ohmic section further includes an inductance connected across said capacitor means in series with said rectifier means, said inductance forming part of a second load.

12. A circuit arrangement as defined in claim 11, comprising at least two parallel branch circuits respectively containing said loads, said switch means being selectively operable for the alternate completion of said branch circuits.

13. A circuit arrangement as defined in claim 11, further comprising other switch means for energizing said second load from said source, the latter having two terminals of opposite polarities respectively connected to said two switch means and a neutral terminal connected to a junction of said loads.

14. A circuit arrangement as defined in claim 13 wherein said other switch means is selectively operable to connect said second load and a third load alternately to the same source terminal, said third load being also connected to said junction, said capacitor means including two condensers and said rectifier means including two rectifiers respectively connected across said second and third loads in series with said two condensers, said diode means including two diodes respectively connected between said condensers and the first load, further comprising selector means coupled with said other switch means for alternately completing respective charging circuits for said condensers in series with said first load.